Dec. 20, 1966    C. VAN DER LELY    3,292,327
PLURAL STORY BUILDING COMPRISING SUPERIMPOSED
BOX-SHAPED DWELLING UNITS
Filed Sept. 8, 1961    8 Sheets-Sheet 1

INVENTOR.
CORNELIS VAN DER LELY
BY
Mason, Mason, & Albright
Attorneys

Dec. 20, 1966 C. VAN DER LELY 3,292,327
PLURAL STORY BUILDING COMPRISING SUPERIMPOSED
BOX-SHAPED DWELLING UNITS
Filed Sept. 8, 1961 8 Sheets-Sheet 2

INVENTOR.
CORNELIS VAN DER LELY
BY
Mason, Mason & Albright
ATTORNEYS

Dec. 20, 1966  C. VAN DER LELY  3,292,327
PLURAL STORY BUILDING COMPRISING SUPERIMPOSED
BOX-SHAPED DWELLING UNITS
Filed Sept. 8, 1961  8 Sheets-Sheet 6

INVENTOR.
CORNELIS VAN DER LELY
BY
Mason, Mason & Albright
ATTORNEYS

Dec. 20, 1966 C. VAN DER LELY 3,292,327
PLURAL STORY BUILDING COMPRISING SUPERIMPOSED
BOX-SHAPED DWELLING UNITS
Filed Sept. 8, 1961 8 Sheets-Sheet 7

INVENTOR.
CORNELIS VAN DER LELY
BY
Mason, Mason & Albright
ATTORNEYS

United States Patent Office 3,292,327
Patented Dec. 20, 1966

3,292,327
PLURAL STORY BUILDING COMPRISING SUPERIMPOSED BOX-SHAPED DWELLING UNITS
Cornelis Van Der Lely, Zug, Switzerland, assignor to Patent Concern N.V., Willemstad, Curacao, Netherlands Antilles, a limited-liability company of the Netherlands Antilles
Filed Sept. 8, 1961, Ser. No. 136,797
Claims priority, application Netherlands, Sept. 14, 1960, 255,903
3 Claims. (Cl. 52—236)

This invention relates to a building comprising at least one story or dwelling floor.

In accordance with the invention the building is assembled from a number of prefabricated, box-shaped elements, each comprising at least part of a story, with the floor or the ceiling or both of at least one of the elements being supported from a number of ribs.

The prefabrication of such elements results in an improved and less expensive construction. The elements thus manufactured are strong and easy to transport and can be assembled rapidly with simple means on the building site.

A second aspect of the invention relates to a building comprising at least one story and built up from a number of box-shaped, prefabricated elements, each of which comprises at least part of a story, with a number of the walls of at least one element being formed of stony material.

A third aspect of the invention relates to a building comprising at least two stories, each of which is built up from at least two prefabricated elements comprising each at least part of a story, with two elements associated with one story being linked to each other by metal connecting members.

A fourth aspect of the invention relates to a building comprising at least one story and constructed from a number of prefabricated elements, shaped in the form of a box and comprising each at least part of a story, with the elements linked to each other by means of locally arranged fastening means and the boundary surfaces of at least a few of the elements provided with openings, which can be closed and through which the fastening of the elements can be performed from the inside.

A fifth aspect of the invention relates to a building comprising at least one story and assembled from a number of prefabricated, box-shaped elements, each of which comprises at least part of a story; this building having a front facade, parallel to which extend the long sides of the elements throughout the width of the building.

A sixth aspect of the invention relates to a building comprising at least one story and built up from one or more box-shaped prefabricated elements, each of which comprises at least part of a story, there being provided in at least one of these elements a chimney duct on one side of a side wall.

The invention furthermore relates to a method of manufacturing the elements to be used for the establishment of a building. In this method at least one of the walls of the element is formed first during the prefabrication process, whereas two walls connected with the former are formed in a device in which the first wall can be arranged and fixed and in which the second and the third wall associated with the first wall can be formed in turn.

The invention relates furthermore to a device for carrying out the method according to the invention.

In accordance with the invention the device comprises a frame adapted to turn about an at least substantially horizontal axis and comprising fastening members for the manufactured walls and the walls to be manufactured.

For a better understanding of the present invention and in order that it may be readily carried into effect, reference will now be made to the accompanying drawings, which show a few embodiments.

FIG. 35 is the ground plan in horizontal section of the ground floor of a different embodiment of a building according to the invention, of which

Figure 1:
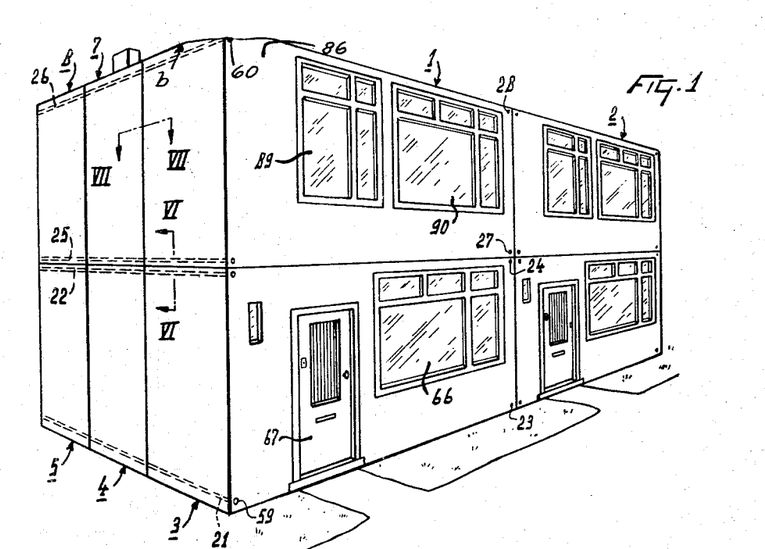
FIG. 1 is a perspective view of the side facade and the front facade of two adjacent buildings built up in accordance with the invention from prefabricated elements.

Referring to FIG. 1, reference numerals 1 and 2 designate two adjacent houses. These houses are of identical shape and comprise each two stories or dwelling floors. The house 1 with the component parts is illustrated in FIGS. 2 to 25 in detail. The first or ground floor of the house 1 is built up from three elements 3, 4 and 5, whereas the second floor of this house comprises three elements 6, 7 and 8. The ground floor comprises a living room 9 and a sitting room 10. At the side of the room 9 a kitchen 11 is arranged and in line with the kitchen 11 are arranged a vestibule or corridor 12 and a staircase 13 (see FIG. 2). Between the staircase and the kitchen provision is made for a toilet 14. On the second floor three bedrooms 15, 16 and 17 and a bathroom 18 are provided. These rooms open out on a landing 19, which is accessible from the ground floor via the staircase opening 20 (see FIG. 3).

Figure 5:
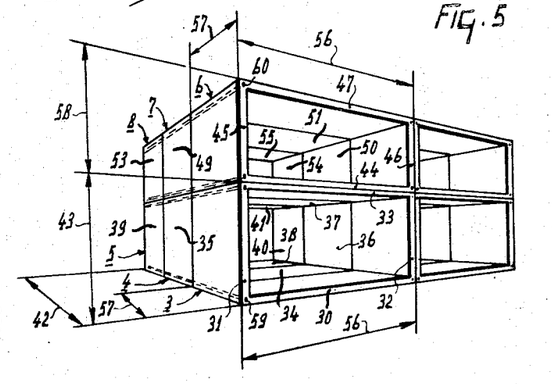
FIG. 5 shows diagrammatically the arrangement of the elements of the two adjacent buildings of FIG. 1. Only the main forms of the elements are shown.
Figure 6:
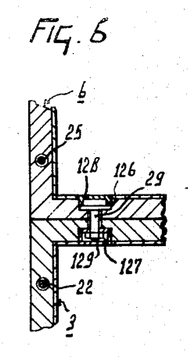
FIG. 6 shows on an enlarged scale a sectional view of the fastening of two elements lying one upon the other, viewed in the direction of the arrow VI—VI in FIG. 1.

The three elements 3, 4 and 5 of the ground floor are joined to each other by two tie rods 21, 22 located on one side of the house, and by two tie rods 23, 24 located on the other side of the house (see FIG. 1). The elements 6, 7 and 8, forming the second floor, are held one against the other on one side of the house by two tie rods 25 and 26 and on the other side of the house by two tie rods 27 and 28. The elements 3 to 5 of the ground floor and the elements 6 to 8 of the second floor may be fastened to each other by means of a plurality of connecting members 29, one of which is shown in FIG. 6. The element 3 comprises a horizontal wall 30, on the ends of which walls 31 and 32 are arranged at right angles and in parallel position (see FIG. 5). The walls 31 and 32 are connected at their other ends by a wall 33, which extends parallel to the wall 30. The walls 30 to 33 constitute the skeleton of the element 3, and are capable of withstanding the forces exerted on the element 3.

The element 4, like the element 3, is formed by four walls 34 to 37, which are shaped in a form such that they are capable of withstanding the forces exerted on the element 4. The element 5 comprises four walls 38 to 41, which determine the main shape of this element. The elements 3, 4 and 5 are of the same size and the length of the element 3 corresponds to the width of the house, whereas the width 57 of the element 3 is equal to one third of the length 42 of the house 1. The height 43 of the element 3 is equal to the height of the ground floor.

The main shape of each of the elements 6, 7 and 8 is also determined by four orthogonal walls. The element 6 comprises four walls 44 to 47, of which the walls 44 and 47 extend in the longitudinal direction of the element and the walls 45 and 46 determine the height of the element.

The element 7 comprises four walls 48 to 51 and the element 8 comprises four walls 52 to 55. The elements 6, 7 and 8 have the same dimensions. The element 6 thus has a length 56, and its width is equal to the width 57 of the elements 3 to 5. The element 6 has a height 58 equal to the height 43 of the elements 3 to 5 and equal to the height of the second floor of the house 1. The elements 3, 4 and 5 are provided in their walls near the corners with holes 59 extending in the direction of width of the elements. In the same manner the elements 6 to 8 are provided with holes 60. The holes 59 of the elements 3, 4 and 5 are in line with each other. This also applies to the holes 60 of the elements 6, 7 and 8.

The tie rods 21 to 24 are taken through the holes 59 of the elements 3, 4 and 5 and the tie rods 25 to 28 are taken through the holes 60 of the elements 6, 7 and 8.

Figure 8:
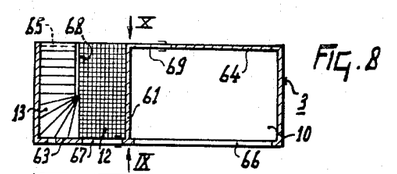
FIG. 8 is a horizontal sectional view of the foremost element of the ground floor of the building shown in FIG. 1.
Figure 9:
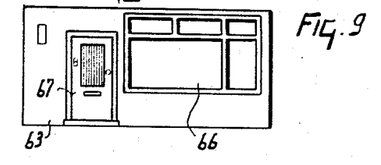
FIG. 9 is an elevation of the side surface of the element shown in FIG. 8, viewed in the direction of the arrow IX; the parts lying behind this side surface are not shown.
Figure 10:
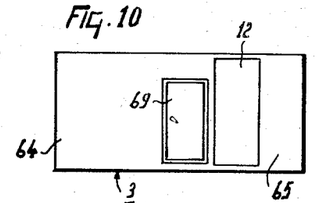
FIG. 10 is an elevation of the side surface of the element shown in FIG. 8, viewed in the direction of the arrow X in this figure, while the parts of the element lying behind this side surface are not shown.

The elements 3 to 8 comprise apart from the four main walls determining the shape of the elements also partition walls separating the rooms of the dwelling from each other and the front facade and the rear facade. The element 3 comprises the partition walls 61 and 62, which extend parallel to the walls 31 and 32 (FIGS. 8 and 9).

The element 3 furthermore comprises partition walls 64 and 65, which are at right angles to the walls 31 and 32 and a wall 63, which constitutes the front facade of the house. In the front facade 63 provision is made of windows 66 and a door 67 and in the partition walls 62 and 64 doors 68 and 69 are arranged, of which the door 68 gives access to a cellar space below the staircase 13. The partition walls and the facade walls may be of a lighter structure than the walls 30 to 33.

Figure 2:
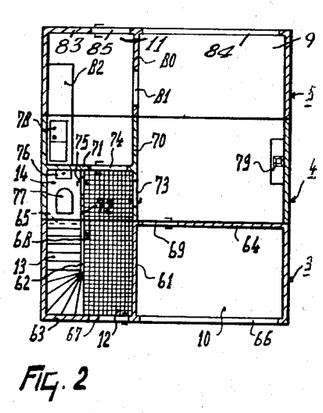
FIG. 2 is a ground or first plan is horizontal section of the ground floor of the foremost building of FIG. 1.
Figure 3:
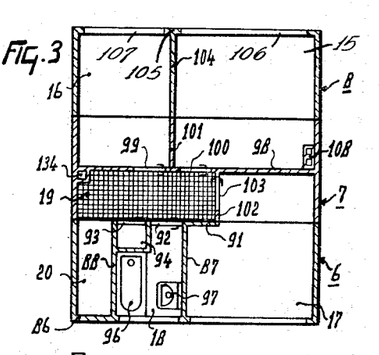
FIG. 3 shows a ground plan in horizontal section of the second floor or story of the foremost building of FIG. 1
Figure 11:
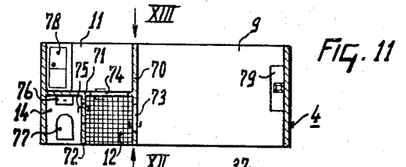
FIG. 11 is a horizontal sectional view of the second element of the ground floor of the building shown in FIG. 1, which element engages the element shown in FIG. 8.
Figure 12:
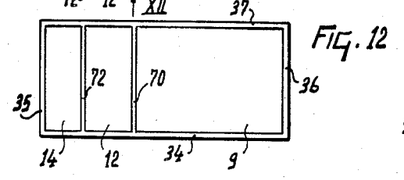
FIG. 12 is a side elevation of the element shown in FIG. 11, viewed in the direction of the arrow XII; the parts lying behind the side surface of this element not being shown.
Figure 13:
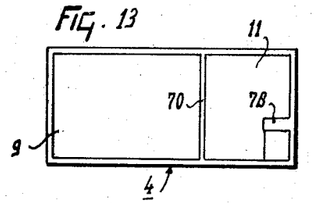
FIG. 13 is a side elevation of the element shown in FIG. 11, viewed in the direction of the arrow XIII; the parts lying behind this side surface not being shown.

The element 4 is provided with partition walls 70, 71 and 72, in which doors 73, 74 and 75 are provided (FIGS. 2, 11 and 12). The toilet 14 has a washing basin 76 and a toilet funnel 77 and in the kitchen part of the element 4 part of the kitchen cabinet is arranged. The part 79 of the chimney in the ground floor is also arranged in the element 4.

Figure 14:
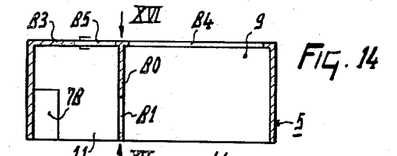
FIG. 14 is a horizontal sectional view of a third element which joins the second element.
Figure 15:
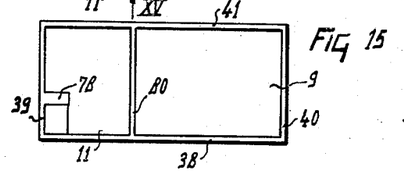
FIG. 15 is an elevation of a side surface of the element shown in FIG. 14, viewed in the direction of the arrow XV; the parts located behind this side surface not being shown.
Figure 16:
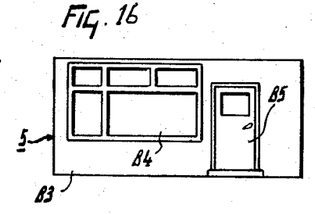
FIG. 16 is an elevation of a side surface of the element shown in FIG. 14, viewed in the direction of the arrow XVI in FIG. 14; the parts located behind this side surface not being shown.

The element 5 is provided with a partition wall 80, in which a service window 81 is provided (FIGS. 14 and 15). It will be noted that a part of the kitchen cabinet to be joined to the part 78 is arranged in the kitchen part of element 5. The element 5 is furthermore provided in the rear facade 83 with a window 84 and a door 85 (FIG. 16).

Figure 17:
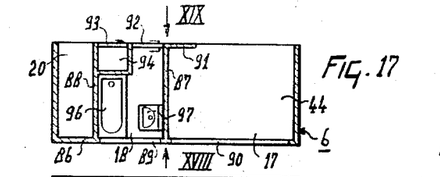
FIG. 17 is a horizontal sectional view of a first element of the second floor of the building shown in FIG. 1
Figure 18:
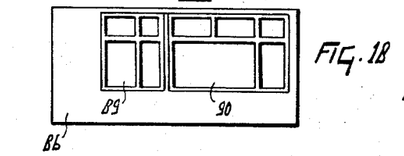
FIG. 18 is a side elevation of a side wall of the element shown in FIG. 17, viewed in the direction of the arrow XVIII; the parts located behind this side surface not being shown.
Figure 19:
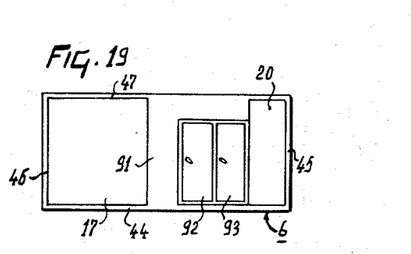
FIG. 19 is an elevation of a side wall of the element shown in FIG. 17, viewed in the direction of the arrow XIX; the parts arranged behind this side wall are not shown.
Figure 20:
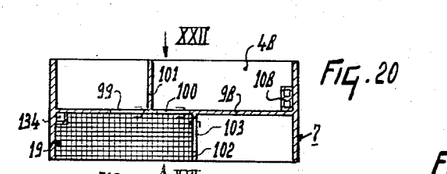
FIG. 20 is a horizontal sectional view of a second element of the second floor, joining the first element.
Figure 21:
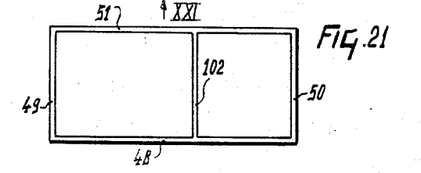
FIG. 21 is an elevation of a side surface of the element shown in FIG. 20, viewed in the direction of the arrow XX; the parts arranged behind this side surface not being shown.
Figure 22:
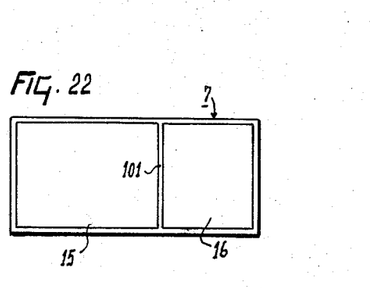
FIG. 22 is an elevation of a side surface of the element shown in FIG. 20, viewed in the direction of the arrow XXI; the parts arranged behind this side surface are not shown.

The elements 6, 7 and 8 of the second floor are also provided with partition walls and parts to be rigidly secured in the dwelling. The element 6 comprises the upper part of the front facade and partition walls 87 and 88. Windows 89 and 90 are provided in the front facade (FIGS. 17 and 18). The separation between the bathroom 18, the room 17 and the landing 19 is formed by a partition wall 91, having doors 92 and 93. The door 93 gives access to a cupboard 94, which is provided in the bathroom and arranged in the element 6. The element 6 furthermore comprises the bath tub 96 and the washing basin 97. The element 7 comprises a partition wall 98 with doors 99 and 100, which give access from the landing to the rooms 15 and 16. Moreover, partition walls 101 and 102 are provided in this element. The partition 102 comprises a door 103. An air duct 134, opening out in the toilet, is also arranged in this element (FIG. 20).

Figure 23:
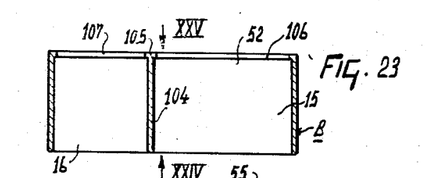
FIG. 23 is a horizontal sectional view of a third element of the second floor, joining the element shown in FIG. 20.
Figure 24:
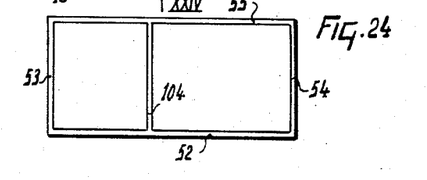
FIG. 24 is an elevation of a side surface of the element shown in FIG. 23, viewed in the direction of the arrow XXIV; the parts located behind this side wall not being shown.
Figure 25:
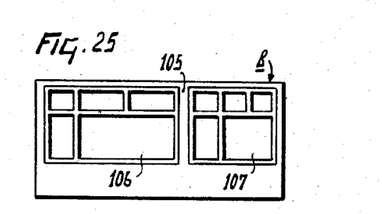
FIG. 25 is an elevation of a further side wall of the element shown in FIG. 23, viewed in the direction of the arrow XXV; the parts located behind this wall not being shown.

The element 8 is provided with a partition wall 104 and the top part 105 of the rear facade, in which windows 106 and 107 are provided (FIG. 23). All the elements 3, 4, 5, 6, 7 and 8 are provided on their surfaces with layers. The element 7 is provided with the top part 108 of the chimney, to be joined to the lower part 79 thereof (FIG. 20).

Figure 26:
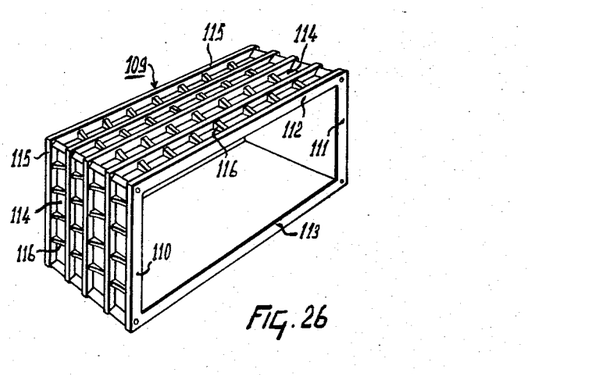
FIG. 26 is a perspective view of the main walls of an element in a different embodiment; no partitions and facades being shown here.

Although, as is shown in FIG. 5, the elements 3 to 8 are constituted by flat walls made from concrete, the main walls of these elements may be formed in a different manner. FIG. 26 shows, by way of example, an element 109, the four main walls of which are formed by two parallel walls 110 and 111 and two parallel walls 112 and 113. Each of these walls, as will be seen from the figure, is formed by a thin wall portion, for example a wall portion 114 of the wall 110. This wall portion 114 is, however, thicker than 1 cm., but thinner than 5 cms. These walls are reinforced by stiffening ribs 115, which extend in the directions of the walls in which the heaviest forces are to be met. These stiffening ribs 115 are interconnected by short arcuated connecting ribs 116, arranged at right angles to the stiffening ribs. These ribs are conducive to the rigidity of the wall. With a given stress such an element may have a lighter weight than the element shown in FIG. 5.

Also the element 109, like the elements 3 to 8, may be provided with partitions, facades, windows, doors, etc. provided therein.

Figure 27:
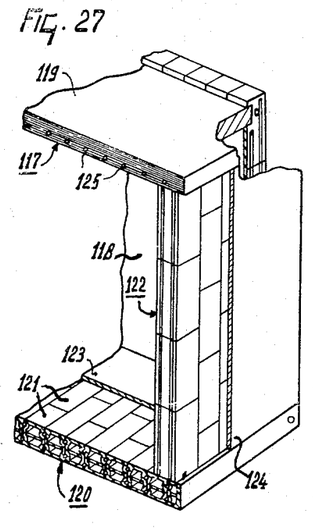
FIG. 27 is a perspective view of part of an element, of which the ground wall and the side walls are made from profiled mansonry, whereas the top wall of this element is made from different material.

FIG. 27 shows an element 117, of which only one of the two upright walls 118 is shown, whereas only parts of the two horizontal walls 119 and 120 are shown. The ground surface 120 of the element 117 and the upright walls 118 of this embodiment are made from hollow bricks 121. The upper wall 119 of the element, which forms a ceiling or part of a ceiling for a room, is made from different material, which is suitable for this purpose. A partition wall 122, arranged in the element 117, is also made of bricks of a given shape. The walls of this element are provided with covering layers, for example the covering layer 123 for the wall 120 and the covering layer 124 for the partition wall 122. The ceiling 119 is made of a kind of material having satisfactorily soundproof qualities. On the lower side this wall is stiffened by rods 125 arranged in this wall. The walls 118 of the element 117 are such that they constitute at least parts of supporting walls for the building, on which an element arranged on top of the element 117 can bear, whereas the wall 120, which constitutes the floor or part of the floor of a room is constructed so that it can withstand the forces exerted thereon. In order to permit of arranging a further element on the element 117, the wall 119, forming the ceiling, is arranged in the side of the wall 118 so that an element to be arranged on the element 117 can bear directly on the supporting walls 118. The wall 119 is made of a material which need not withstand forces, so that its weight may be small.

The connecting members 29 between the elements arranged one on the other are accommodated in recesses 126 of a floor wall of an element and in recesses 127 of the ceiling wall of an element (FIG. 6) and when the connecting members 29 have been disposed, these recesses 126 and 127 are closed by loose closing members 128 and 129 respectively, which fit therein and are made of a material suiting the floor and the ceiling concerned.

Figure 7:
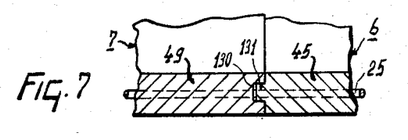
FIG. 7 shows on an enlarged scale a detail of two contacting edges of the elements, viewed in the direction of the arrow VII—VII in FIG. 1.

The short connecting members 29, used for linking elements to each other, may also be used successfully for connecting two elements side by side to each other, which engage each other by their flat sides of two walls. In the houses 1 and 2, for example, the walls 32, 36 and 40 of the elements 3, 4 and 5 engage the walls of further elements of the house 2 and between these interengaging walls connecting members 29 are arranged as is shown in FIG. 6. The walls of the elements lying in line with the walls of a further element, as is shown in FIG. 7, are provided with grooves or recesses 130 and tongues or extensions 131, adapted to fit into recesses 130.

The tie rods 21 to 28 draw the extensions 131 satisfactorily into the recesses 130, so that elements are rigidly held relatively to each other. The tie rods 21 to 28 are secured with their ends in the elements.

Figure 4:
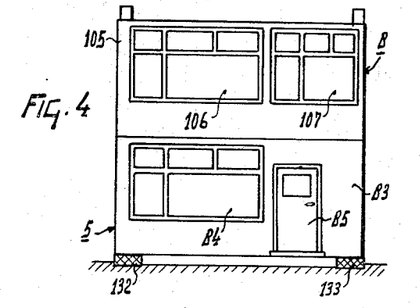
FIG. 4 is an elevation of the rear facade of the foremost building of FIG. 1.

The elements 3, 4 and 5 are arranged on foundation beams 132 and 133, when they are joined (FIG. 4). They are secured thereto also by means of connecting members such as bolts 29.

Figure 28:
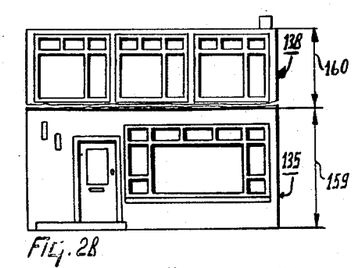
FIG. 28 is a front elevation of a second embodiment of a building according to the invention.
Figure 29:
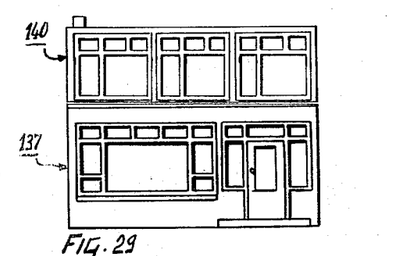
FIG. 29 is a rear view of the building shown in FIG. 28.
Figure 30:
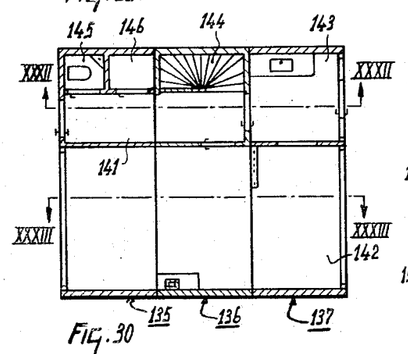
FIG. 30 shows a ground plan in horizontal section of the ground floor of the building shown in FIGS. 28 and 29.

The house shown in FIGS. 28 to 30 comprises a ground floor composed of three elements 135, 136 and 137. The ground floor comprises a living room 142, which extends throughout the width of the three elements 135 to 137. In the element 137 is accommodated the kitchen 143, which is surrounded completely by the element 137 and which occupies the full width of the element 137. In the central element of the three elements of the ground floor the staircase 144 is arranged and in the outer element 135 is arranged the toilet 145 and a cupboard 146. A corridor 141 extends throughout the width of the two elements 135 and 136.

Figure 31:
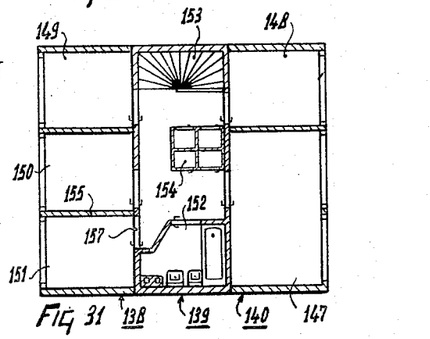
FIG. 31 is a sectional plan view of the second floor of the building shown in FIGS. 28 and 29.
Figure 32:
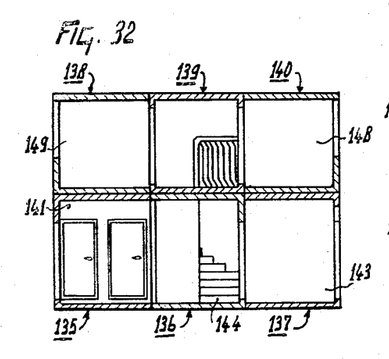
FIG. 32 is a sectional view of the building shown in FIGS. 28 to 31, viewed in the direction of the arrow XXXII—XXXII in FIGS. 30 and 31.
Figure 33:
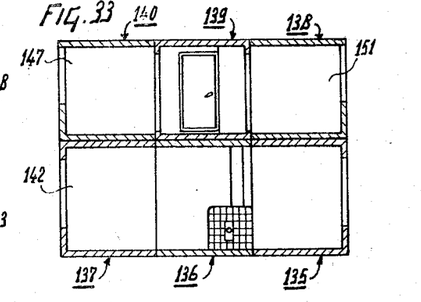
FIG. 33 is a sectional view of the building shown in FIGS. 28 to 31, viewed in the direction of the line XXXIII—XXXIII in FIGS. 30 and 31.

In the second floor five bedrooms 147 to 151 are provided, which are formed so that each bedroom as a whole is contained in one element (FIG. 31). The bedrooms 147 and 148, for example, are arranged in the element 140, whereas the three bedrooms 149, 150 and 151 are accommodated in the element 138. The element 139, the central of the three elements of the second floor, comprises a bathroom 152 and a staircase opening 153. The bathroom 152 is provided at one end and the staircase opening 153 is arranged at the other end of the element 139. Between the staircase opening 153 and the bathroom 152 provision is made of a landing on which the doors of the five bedrooms open out. Moreover, a series of cupboards 154 may be provided on the landing.

Figure 34:
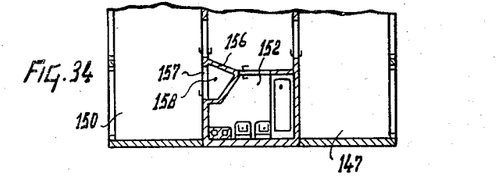
FIG. 34 shows a sectional plan view of part of the second floor of the building shown in FIGS. 28 to 31; this part being subdivided in a manner differing from that shown in FIG. 31.

FIG. 34 shows part of the second floor of the house shown in FIGS. 28 to 31. The part shown is subdivided in a manner differing from that shown in FIG. 31. It will be seen from FIG. 34 that the bedrooms 151 and 150 are joined to form one larger bedroom. To this end the wall 155 between the bedroom 151 and 150 can be arranged in the element 138 so as to be readily dismountable, so that at will the bedrooms 150 and 151 may be left separated or be united to form one bedroom 150. The passage towards the door for the room 151, when the rooms 150 and 151 are united, may be employed for forming a cupboard, to which end an intermediate partition 156 is provided, which can be readily mounted at its place, which is shown in FIG. 34. The door 157 for the room 151 may then serve as a door for the cupboard 158. The elements 135, 136 and 137 are of the same length and width as the elements 138, 139 and 140 and the elements of the second floor are just arranged on top of the elements of the ground floor. The height 159 of the elements of the ground floor differs from the height 160 of the elements of the second floor. The elements of the second floor have a slightly smaller height than the elements of the ground floor.

Figure 35:
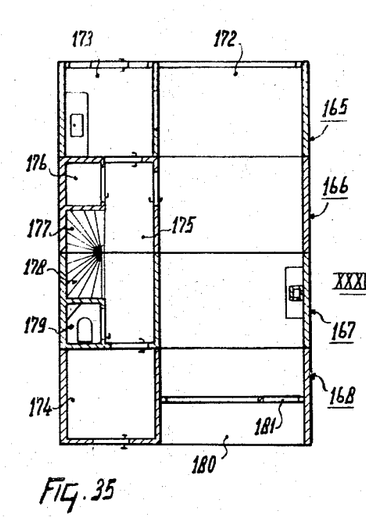
Figure 36:
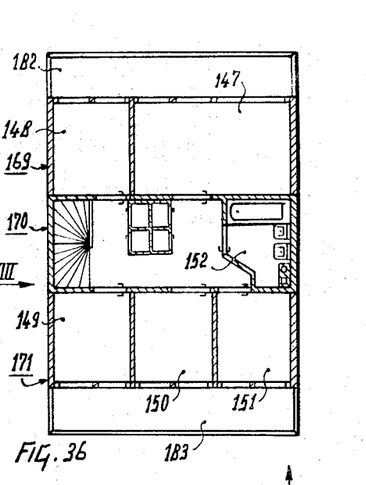
FIG. 36 is a sectional plan view of the second floor.
Figure 37:
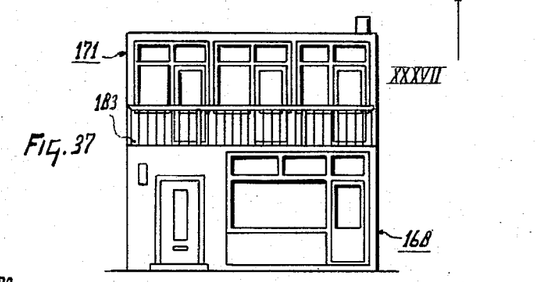
FIG. 37 is an elevation of the front facade of the building shown in FIGS. 35 and 36, viewed in the direction of the arrow XXXVII in FIGS. 35 and 36.
Figure 38:
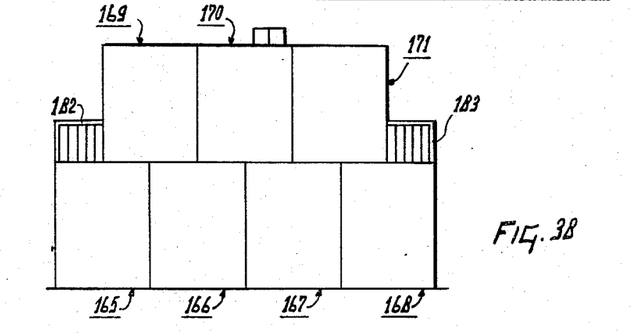
FIG. 38 is a side elevation of the building shown in FIGS. 35 and 36, viewed in the direction of the arrow XXXVIII in FIGS. 35 and 36.

FIGS. 35 to 38 show a further embodiment of a house built up of elements according to the invention. The house in this embodiment comprises seven elements, the ground floor comprising four elements 165 to 168 and the second floor comprising three elements 169 to 171. The ground floor of the house shown in FIGS. 35 to 38 comprises a room 172, which extends throughout the three elements 165 to 167 and half of the width of the element 168 (FIG. 35). The element 165 comprises the kitchen 173 and the element 168 comprises the hall 174. The elements 166 and 167 comprise a corridor 175, which communicates the hall with the kitchen. The element 166 has a cupboard 176 and the lower half 177 of the staircase whereas the element 167 comprises the top half 178 of the staircase and the toilet 179. The half 180 of the element 168, lying outside the room 172, forms a terrace which can be attained from the room 172 through a door 181, provided in the facade of the room 172. The top floor of this house is arranged in the same manner as shown in FIG. 31, so that the rooms of FIG. 36 could be designated by the same reference numerals as in FIG. 31.

The elements 169 to 172 are shifted in place with respect to the elements 165 to 168. The width and the length of the elements of the ground floor and of the second floor are the same so that the elements 169 to 171 bear each by half on a different element. Since four elements are provided in the ground floor and three elements in the first floor, a balcony 182 and a balcony 183 is formed on the front side and on the rear side, respectively, of the second floor. These balconies can be attained from the bedrooms of the second floor through doors provided in the front facade and in the rear facade.

Figure 39:
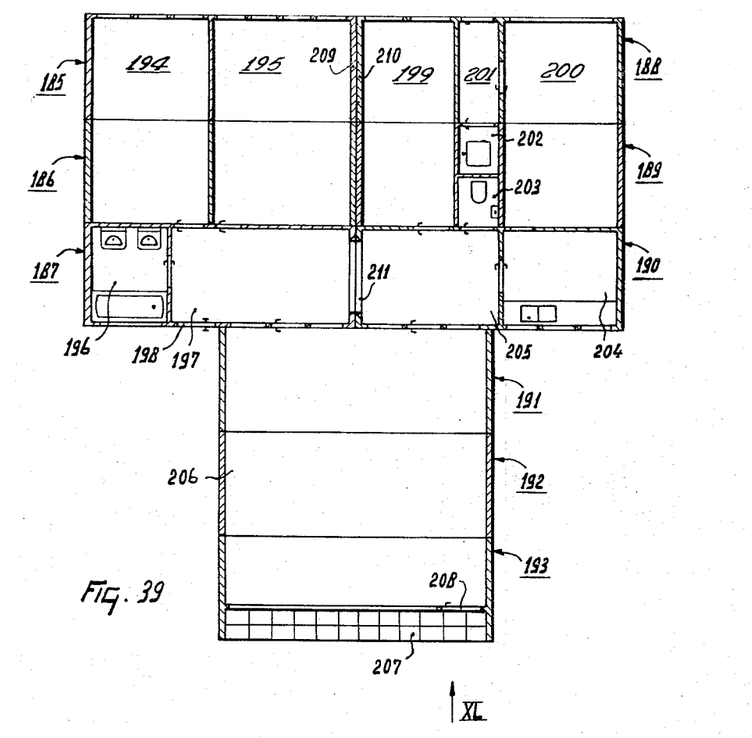
FIG. 39 shows the ground plan in horizontal section of a bungalow built up in accordance with the invention from elements.
Figure 40:
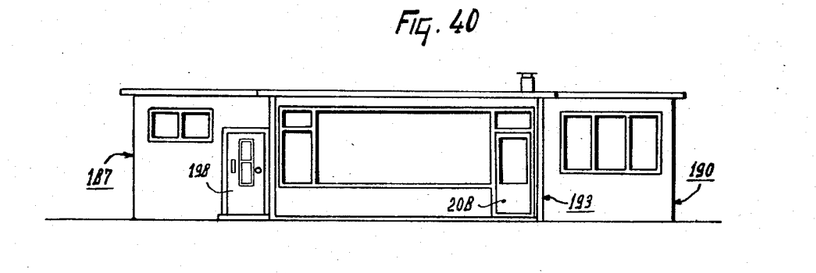
FIG. 40 is an elevation of the bunaglow shown in FIG. 39, viewed in the direction of the arrow XL in FIG. 39.

FIGS. 39 and 40 show a ranch type house or bungalow built up from elements according to the invention. This bungalow comprises nine elements, which are arranged in three groups of three elements, which are fastened to each other. A first group comprises the three elements 185, 186 and 187 and a second group comprises the elements 188, 189 and 190. These two groups of three elements each are arranged relatively to each other so that the elements 185, 186 and 187 are in line with the elements 188, 189 and 190 respectively. The third group of elements 191, 192 and 193 is arranged to the first two groups so that the three groups form a T. The elements 185 and 186 comprise two bedrooms 194 and 195, each of which extends throughout the width of two elements. The element 187 comprises a bathroom 196 and a vestibule or hall 197, the hall communicating with the outside via a door 198. The elements 188 and 189 comprise a third bedroom 199, which also extends throughout the width of the two elements.

The elements 188 and 189 furthermore comprise a garage 200 and between the garage and the bedroom 199 provision may be made of a storing space 201 and the central heating 202 and a toilet 203. The element 190 comprises the kitchen 204 and a corridor 205. The elements 191, 192 and 193 comprise a living room 206, which can be reached from the hall 197 and the corridor 205.

The element 193 comprises only part of the living room and the further part is used for terrace 207, which can be reached through a door 208 from the room 206. The three elements of each group are connected with each other by means of tie rods, as is shown in the first embodiment for the elements 3 to 5. The walls of the elements, which form the partitions 209 and 210, which join each other and constitute a supporting inner wall for the bungalow, are fastened to each other by means of connecting members of which one is shown in FIG. 6.

Since the walls 209 and 210 constitute supporting walls for the bungalow, they are provided only at one place, i.e. at the place 211, with openings communicating with each other the rooms provided in the group of elements 185 to 187 and in the group of elements 188 to 190. The group of elements 191 to 193 joins that side of the elements 187 to 190 which is not a supporting wall for the element concerned, so that in these adjacent surfaces non-supporting partitions with doors or windows or both can be provided without any objection. The aligned walls of the elements, engaging each other with their sides, are provided with recesses and extensions of the kind shown in FIG. 7, the extensions fitting in the recesses so that a satisfactory connection between the elements is established.

The elements of the houses in the embodiments shown are prefabricated in the factory and during the prefabrication these elements are completely finished. The outer walls are provided with covering layers, which can resist weather conditions, whereas the inner walls and the partitions are also provided with covering layers, which may serve as ornamental layers or as insulating layers. These covering layers, which are not shown in all figures, are shown in FIG. 27 for the wall 121, constituting the floor of the element, and for the partition 122 and are designated by the reference numerals 123 and 124. Also the tiles in the corridor and the landing are arranged in various elements of the first embodiment, as is shown in the figures. The doors and windows and other fixed parts of the house are arranged in place during the prefabrication of the elements. In mounting the houses the elements need therefore be linked to each other only by means of the tie rods and the connecting members, which may be carried out rapidly. The tie rods can be fastened in the element so that they are more or less prestressed for clamping the elements to each other. Thus the mounting operation can be carried out substantially independently of weather conditions and the prefabrication of the elements can be performed in the factory hall irrespective of the weather. Particularly in countries where low temperatures and other unfavorable weather conditions in given seasons are likely to hinder building activities such a prefabrication will yield savings in cost and time. The prefabrication of the elements in the factory may furthermore have the advantage that the machines provided in the factory permit of manufacturing cheaper elements at a greater rate.

The elements preferably have a width, for example the width 57 of the element 3, smaller than 300 cms. and greater than 100 cms. The length of the elements, for example the length 56 of the element 3, is preferably smaller than 750 cms. and greater than 300 cms. However, the length of the elements may be greater. The height of the elements, for example the heights 43 and 58 of the elements 3 and 6 respectively, is preferably between 200 cms. and 350 cms. In accordance with the purpose of the building built up from the elements, the dimensions thereof may vary. If the elements are employed for a house, to which end they are particularly suitable, the length of the elements is preferably not greater than 750 cms. However, if the elements are used for building up a building for other purposes than a dwelling, for example for offices and assembly halls, the length of the elements may be greater. However, it will preferably not exceed 1000 cms. The height of the elements may also vary and for offices or halls it will be greater than for a dwelling house. The dimensions of an element will, however, always be such that the elements can be transported by road and come up to the dimensions prescribed by law for road transport.

Owing to the dimensions of the elements as shown and to the connectability of the main walls of the element with the partitions of different elements, a house can be built up from a small number of elements for example fewer than ten separate parts, so that by connecting these elements to each other the house can be constructed rapidly.

In order to facilitate mounting of the houses the ducts for sanitary and electricity may be arranged in the walls of the elements during the prefabrication process.

Although in the embodiments shown different types of houses are shown, the subdivision of the houses may be different and the preferably equal-sized elements may be shaped in different forms. For example, in the embodiments of FIGS. 35 to 38 the balcony 182 and the balcony 183 may also be formed by building up the ground floor from the same number of elements as the second floor, the widths of the elements of the ground floor being, however, greater than the widths of the elements of the second floor, so that the ground floor will be larger than the second floor.

A house of the kind shown in FIGS. 28 to 33, comprising six elements, may be built up from not more than four elements while the subdivision of the elements is approximately the same. The bedrooms 149 to 151 and part of the living room 142, the hall 141 and the cupboard 146 are then omitted. The toilet 149 is then accommodated in the bathroom 129. Thus a small, cheap dwelling can be constructed. Since the elements have a length and a width of about 2.5 meters and a length approximately twice or more times 3 meters, while only two long sides and two short sides constitute supporting walls for the element, so that the two long sides forming supporting walls constitute a floor and a ceiling, two long sides are left open, which may be used for non-supporting facades comprising windows and doors and for the formation of rooms extending throughout the widths of a number of elements.

Although in the embodiments shown the houses built up from the elements according to the invention comprises two or more dwelling floors, more than two dwelling floors or two or more houses each comprising one or more dwelling floors may be arranged one on the other.

The following method may be used for manufacturing the elements. Of the four orthogonal walls, first the walls 31 and 32 of the element 3, for example, are formed in horizontal molds from cast concrete. After these walls 31 and 32 have been made, the walls 30 and 33 can be connected herewith. The arrangement of the walls 30 and 33 on the walls 31 and 32 may be carried out in a rotatable device, in which first the wall 30 and then, after a turn of the device, the wall 33 can be fastened to the walls 31 and 32. A device in which the walls 30 and 33 and the walls 31 and 32 can be made and assembled, is shown in detail in FIGS. 41 and 42.

It is shown diagrammatically in these figures that the device comprises mainly four rings 215, 216, 217 and 218, which are linked to each other by beams 219 and beams 220. The outer rings 215 and 218 constitute mainly the supporting structure for the device and are each arranged on four rollers 221, which are rotatably arranged in a frame 222. On the top side the rings 215 and 218 are supported each from two rollers 223, provided at the frame 222. Inside the rings 215 to 218 provision is made of two frames 224 and 225, which are shaped in the same form and of which the frame 224 is shown in detail in FIG. 42. The frame 225 comprises two rods 226 and 227, which are disposed parallel to each other. The rods 226 and 227 are arranged on a guide member 228 and 229 respectively. These guide members are slidably connected with the beams 220 and can be fixed in a plurality of positions with respect to the beams 220 by means of mechanisms not shown in detail in FIGS. 41 and 42. The ends of the rods 226 and 227 are connected to each other by beams 230 and 231, which are slidable on the ends of the rods 226 and 227 and can be fixed in a plurality of positions relative to these rods by locking members not shown in these figures.

Figure 41:
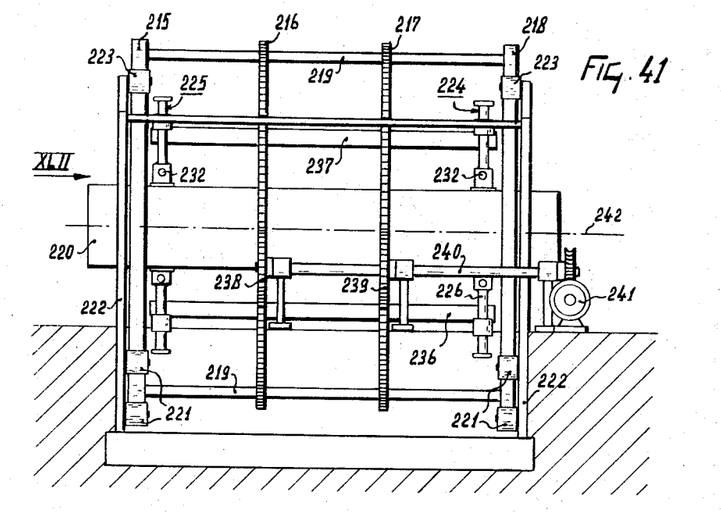
FIG. 41 is a side elevation of a device by means of which a given method of manufacturing the elements according to the invention can be carried out.
Figure 42:
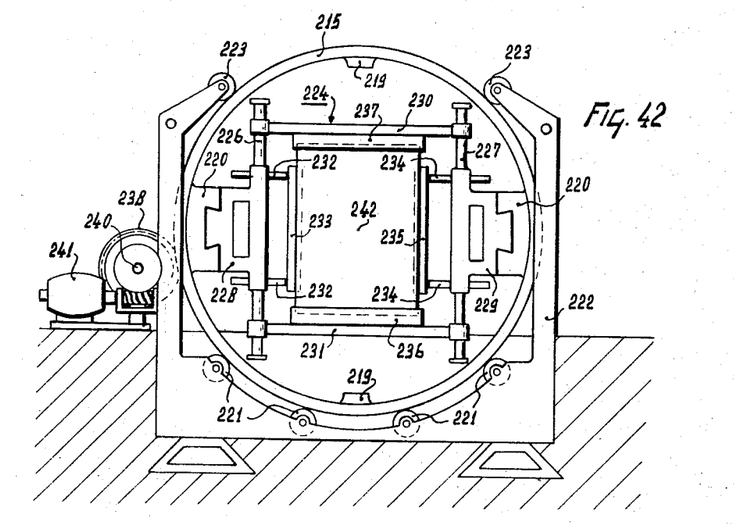
FIG. 42 is an elevation of the device shown in FIG. 41, viewed in the direction of the arrow XLII in FIG. 41.

The guide member 228 comprises two shafts 232, the ends of which are connected with each other by a clamping plate 233. The shafts 232 and the clamping plate 233 are displaceable with respect to the guide member 228 in a direction at right angles to the longitudinal direction of the shaft 226 and are fixable in a plurality of positions by means of a locking member (not shown). In the manner in which the guide member 228 is provided with shafts 232 and a clamping plate 233, the guide member 229 is provided with two shafts 234, the ends of which are connected with each other by a clamping plate 235.

For the manufacture of the walls 30 and 33 and for connecting them with the walls 31 and 32, the wall 31 is clamped tight between the plates 233 and 235, whereas the wall 32 is clamped tight in the same manner between similar clamping plates provided in the frame 225. The clamping between the plates 233 and 235 is permitted by the slidability of the shafts 232 and 234 with respect to the guide members 228 and 229 and by the fixability thereof. When the walls 31 and 32 are disposed in the frames 224 and 225 and when the device occupies a position as is shown in the figures a mold 236 is arranged on the beam 231 of the frame 224 and on a similar beam of the frame 225 and fastened to these beams by fastening means (not shown). When the mold 236 is at its suitable place, it can be filled with concrete and the lower sides of the walls 31 and 32, which terminate in this mold, are cast tight to the wall 30. When the wall 30 has been formed and hardened, the device can be turned through 180°, after which a mold 237 is secured to the beam 230, the wall 33 can be formed in this mold and cast tight to the walls 31 and 32. In order to obtain a satisfactory connection between the walls 31 and 32 and the walls 30 and 33, the walls 31 and 32 may be provided with recesses or extensions fitting in the walls 30 and 33 during the casting operation. When the elements are made from concrete and the walls are provided with reinforcement, the iron reinforcement may project beyond the lower side and the top side of the walls 31 and 32, so that this reinforcement becomes cast tight in the walls 30 and 33. The reinforcement of the walls 31 and 32 may even be twisted together with the reinforcement of the walls 30 and 33 prior to the casting operation.

For turning the device the rings 216 and 217 are provided on their outer sides with teeth, engaged by the teeth of gear wheels 218 and 219, seated on a shaft 240, which is driven by an electric motor 241 by means of a transmission gear.

The partition walls of an element, for example the partition wall 64 and the facade wall 63 of the element 3 can also be formed in the device shown in FIGS. 41 and 42 and be fastened during the casting operation to the walls 30, 33, 31 and/or 32. Then the clamping plates 233 and 235 have to be adapted so that molds can be secured thereto, in which the said partitions can be manufactured.

Owing to the adjustability of the beams 230 and 231 and of the clamping plates 233 and 235 in a direction at right angles to the axis of rotation 242 of the device and owing to the slidability of the frames 224 and 225 in the longitudinal direction of the device along the beams 220 the device can be employed for the formation of elements of different sizes. The device shown in FIGS. 41 and 42 may also be used for elements the walls of which are made from other material or by different methods or both.

For finishing the main walls and the partition wall of an element, the element can be arranged in this device or in a different rotatable device, so that the covering layers for the partitions and the main walls can be applied in the most favorable positions of these walls.

The device in which the elements are made and/or finished may be arranged so that a vehicle for transporting the elements can ride into or along the frame of the device to take over the element.

Since the width and the height of the element lie between 100 cms. and 300 cms. the walls are easily accessible at any place for the manufacture and the finish, so that these operations are facilitated.

As used in the claims, it will be understood that "prefabricated elements" are units which have been completely constructed at the factory including inner walls, partitions, weather covering, electrical and sanitary ducts, and the like, so that construction at site is minimal except for the positioning and securing of the elements in their desired locations:

What I claim is:

1. A building having at least a lower story and an upper story which is constructed from a plurality of box-shaped prefabricated elements, at least one of said elements in said upper story being superimposed on an element of said lower story, each of said elements having substantially the same cross-sectional rectangular configuration from a side elevation and including a floor, walls and ceiling, at least one of said elements on said lower story including two parallel spaced apart vertical walls composed of a stony material, said parallel spaced apart vertical walls having their upper edges higher than the upper side of the ceiling of said element which includes said vertical walls, the walls of said superimposed element resting at least in part on and being carried by said upper edges of said vertical walls, said elements aligned with respect to their walls, floors and ceilings and secured together.

2. A building in accordance with claim 1 wherein said spaced apart walls of said lower story are supported by spaced apart foundation beams.

3. A building in accordance with claim 1 wherein said walls are made from hollow bricks.

References Cited by the Examiner

UNITED STATES PATENTS

| | | | |
|---|---|---|---|
| 1,362,069 | 12/1920 | Witzel | 52—745 |
| 1,496,027 | 6/1924 | Schuck | 25—41 |
| 1,863,543 | 6/1932 | Palmer | 52—220 |
| 1,886,962 | 11/1932 | LaRoche | 52—79 |
| 1,943,036 | 1/1934 | O'Reilly | 52—236 |
| 2,034,215 | 3/1936 | Stencel | 52—206 |
| 2,168,725 | 8/1939 | Whelan | 52—220 |
| 2,691,291 | 10/1954 | Henderson | 52—236 |
| 3,003,188 | 10/1961 | Weiss | 25—41.5 X |
| 3,006,053 | 10/1961 | Miller | 25—41.7 |

FOREIGN PATENTS

| | | |
|---|---|---|
| 130,683 | 12/1948 | Australia. |
| 509,590 | 3/1952 | Belgium. |
| 552,897 | 2/1958 | Canada. |
| 991,685 | 6/1951 | France. |
| 992,188 | 7/1951 | France. |
| 993,105 | 7/1951 | France. |
| 1,125,442 | 7/1956 | France. |
| 1,219,928 | 12/1959 | France. |
| 802,658 | 7/1951 | Germany. |
| 577,817 | 1958 | Italy. |

FRANK L. ABBOTT, *Primary Examiner.*

JACOB L. NACKENOFF, *Examiner.*

A. C. PERHAM, *Assistant Examiner.*